M. N. VIRATELLE.
CHANGE SPEED GEARING.
APPLICATION FILED FEB. 15, 1910.

990,824.

Patented Apr. 25, 1911.

3 SHEETS—SHEET 1.

WITNESSES
W. P. Burke
John A. Percival

INVENTOR
Marcel N. Viratelle
BY
ATTY.

M. N. VIRATELLE.
CHANGE SPEED GEARING.
APPLICATION FILED FEB. 15, 1910.

990,824.

Patented Apr. 25, 1911.

3 SHEETS—SHEET 2.

WITNESSES
W. P. Burke
John A. Percival

INVENTOR
Marcel N. Viratelle

M. N. VIRATELLE.
CHANGE SPEED GEARING.
APPLICATION FILED FEB. 15, 1910.

990,824.

Patented Apr. 25, 1911.
3 SHEETS—SHEET 3.

WITNESSES
W. P. Burke
John A. Percival

INVENTOR
Marcel N. Viratelle

UNITED STATES PATENT OFFICE.

MARCEL NARCISSE VIRATELLE, OF PARIS, FRANCE.

CHANGE-SPEED GEARING.

990,824.   Specification of Letters Patent.   Patented Apr. 25, 1911.

Application filed February 15, 1910. Serial No. 544,033.

*To all whom it may concern:*

Be it known that I, MARCEL NARCISSE VIRATELLE, of 49 Rue du Surmelin, in the city of Paris, Republic of France, have invented a Change-Speed Gearing especially applicable to motor-vehicles, of which the following is a full, clear, and exact description.

This invention relates to a change-speed gearing having an epicyclic movement and especially applicable to motor vehicles.

This change-speed gearing is constituted substantially by a combination of parts giving a very great reduction of the number of revolutions of the crank of the explosion motor and that under a small volume, by reason of the employment of the driving shaft and of a planet shaft as axes for loose pinions which enter in the combination of the gears used for obtaining the different speeds.

This change-speed gearing will be described hereafter as being applied to a motor-cycle and with three different speeds without backward drive which is not necessary in that kind of vehicle.

Figure 1:
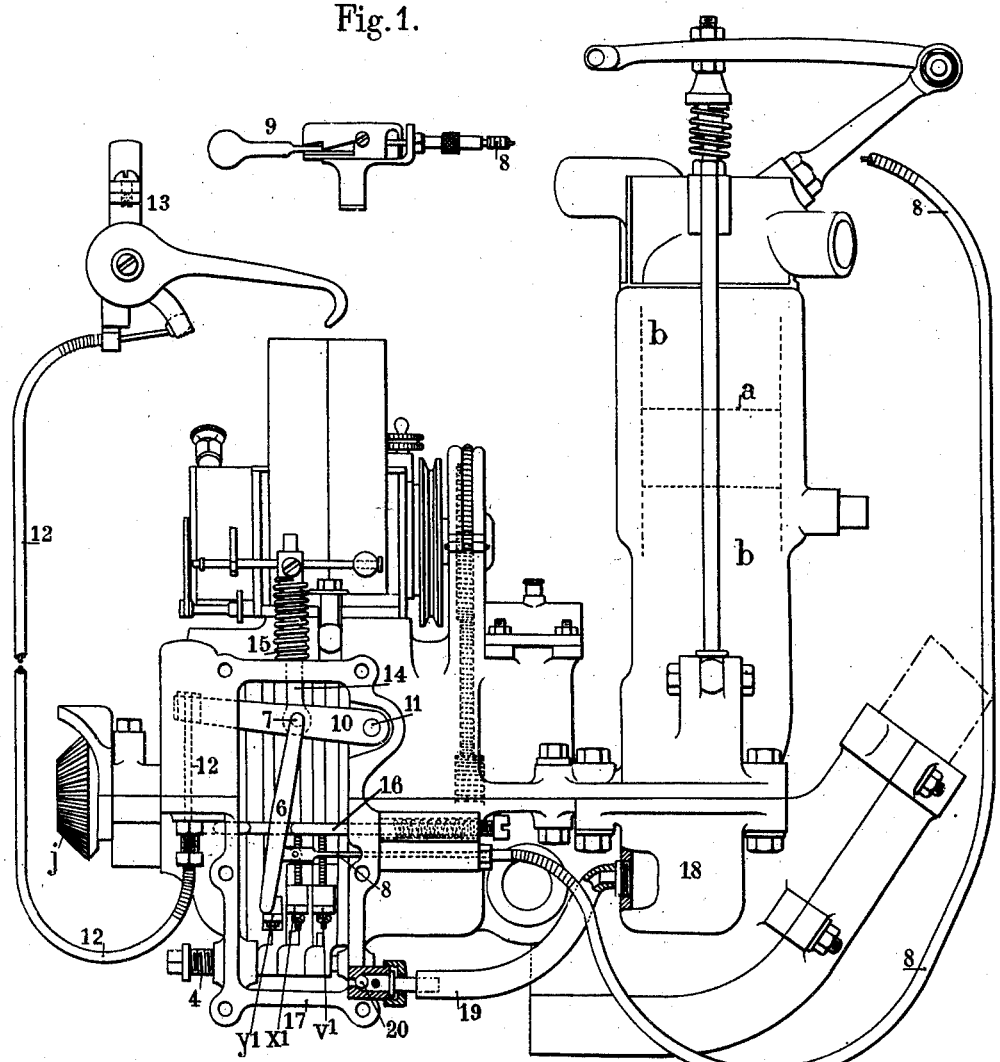
Figure 3:
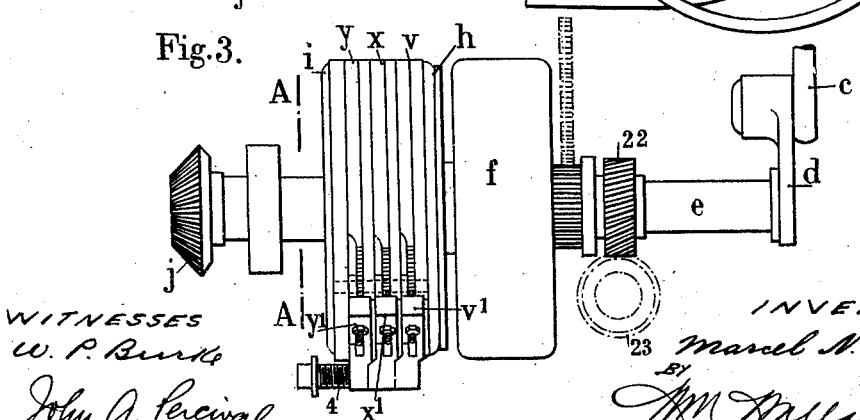
Figure 2:
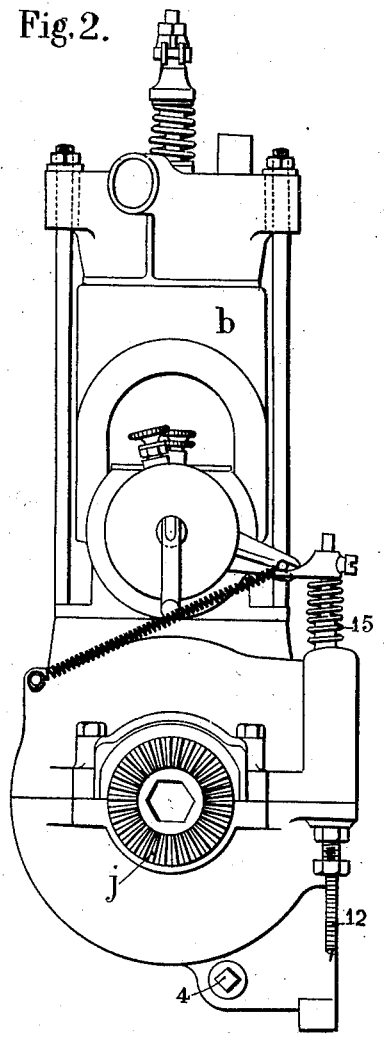
Figure 4:
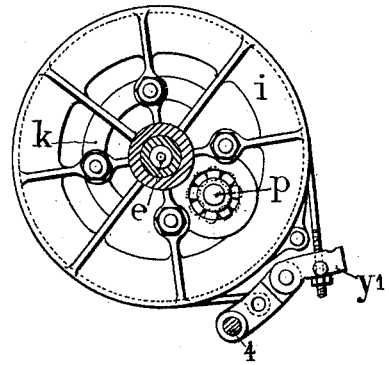
Figure 6:
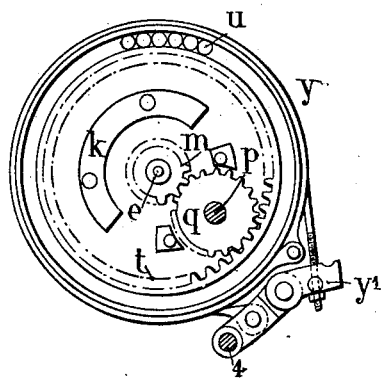
Figure 5:
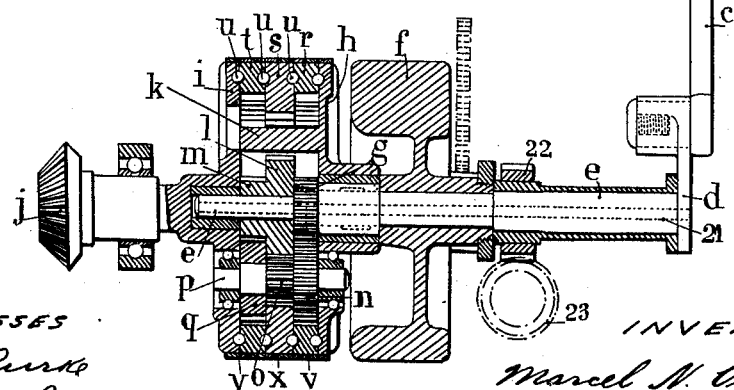
Figure 7:
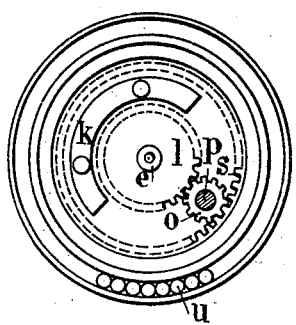
Figure 8:
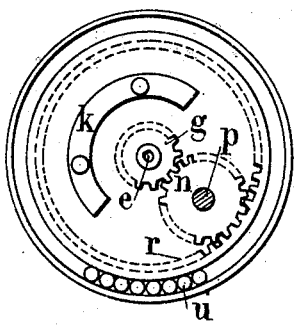
Figure 9:
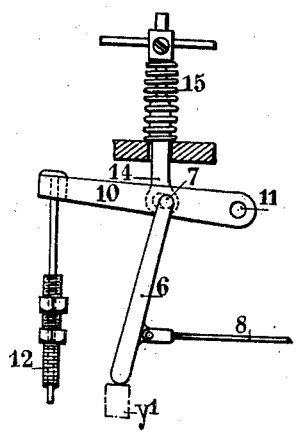
Figure 10:
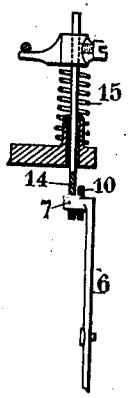
Figure 11:
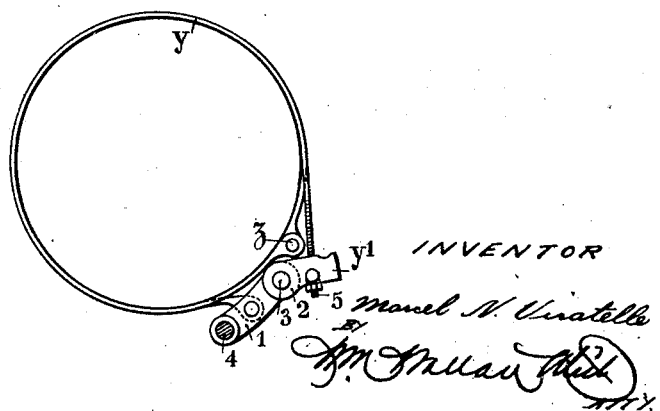

In the accompanying drawings: Figure 1 is a side view of this change-speed gearing as a whole, the cover of the gear case being removed in order to show the parts inclosed therein. Fig. 2 is a back view thereof. Fig. 3 is a side view of the change-speed gearing proper. Fig. 4 is a cross section made on line A—A of Fig. 3. Fig. 5 is a longitudinal section of the parts of this change-speed gearing proper. Fig. 6 is a side view of the position of the parts for obtaining the low speed. Fig. 7 is a side view of the position of the parts for obtaining the intermediate speed. Fig. 8 is a side view of the position of the parts for obtaining the high speed. Fig. 9 shows detached a clutching device of this change-speed gearing. Fig. 10 is a side view, partly in section of the device shown in Fig. 9. Fig. 11 is a side view of one of the three collars on which acts at will the clutching device shown in Figs. 9 and 10.

As illustrated in the drawing, a piston $a$ is placed in the cylinder $b$ of the explosion motor and actuates, by means of a connecting rod $c$ and of a crank $d$, the driving shaft $e$ on which is rigidly mounted a fly-wheel $f$ and a high speed pinion $g$. On the driving shaft $e$ are loosely mounted a plate $h$ and a plate $i$ provided with a bevel pinion $j$ driving the chain wheel of the motor cycle. The plates $h$ and $i$ are connected together by means of a cross-bar $k$ so as to constitute a case in which are inclosed the various parts of the change-speed gearing. In this case is placed an intermediate speed pinion $l$ and a low speed pinion $m$. These two pinions are integral with one another and are loosely mounted on the driving-shaft $e$. In the said case is also placed a planet pinion $n$ for the high-speed and a planet pinion for the intermediate speed. These two pinions are integral with one another and are rigidly mounted on a planet shaft $p$ journaled in the two plates of the case. In the planet shaft is also loosely mounted a planet pinion $q$ for the low speed.

Between the plates $h$ and $i$ are placed three internally toothed crowns $r$ $s$ $t$ which correspond to the three speeds. The crown $r$ corresponding to the high speed gears with the planet pinion $n$. The crown $s$ corresponding to the intermediate speed gears with the planet pinion $o$. The crown $t$ corresponding to the low speed gears with the planet pinion $q$. The crowns $r$ $s$ $t$ and the plates $h$ and $i$ are separated by ball bearings $u$.

The crowns $r$ $s$ $t$ are each directly surrounded by double metal collars $v$ $x$ $y$, Fig. 3. These collars are arranged parallelly and constitute brakes. The collars $v$ $x$ $y$ are provided with a hinge $z$, Fig. 11, while the free branches of these collars are hinged on two links 1 and 2 hinged themselves at 3 on one another. The link 1 can move upon a screw 4, while the other link 2 receives the threaded end of the collar which is secured upon this link by means of a nut 5.

The links 2 constitute by their heels controlling keys $v'$ $x'$ $y'$ Figs. 1, 3, 4 and 5, and for that purpose are provided on the top with a notch capable of receiving a kind of clutching push piece 6, Figs. 1, 9 and 10, hinged at 7 and which may be moved from one key to the other according to the speed required. For this purpose, the push piece 6 is connected to a Bowden cable 8 controlled by a locking device 9 provided with three notches and mounted on the handle-bar of the motor-cycle. In addition to its lateral movement, the pivot 7 of this push piece 6 is engaged in a lever 10. This lever hinged at 11 at one of its ends is intended to lower the push piece 6 so that it may press upon the key before which said push piece has been brought and which corresponds to the required speed. In order to determine the descent of the lever 10, this lever is operated by means of a Bowden cable 12 controlled by a locking device 13. This locking device 13 is secured on the handle-bar of the motor-cycle. The push piece 6 and the lever 10 are raised by means of a rod 14 and of a return spring 15. Moreover, a sliding spring rod 16 always brings back the push piece 6 opposite the key $y'$ corresponding to the low speed.

In order that the different parts of this change-speed gearing may work in a suitable manner, it is necessary that the gear case 17 surrounding said parts should contain a certain quantity of oil often renewed. For that purpose, the crank-box 18 secured to the lower part of the cylinder $b$ is provided with a pipe 19 leading to the gear case of the change-speed gearing and connected to the latter by means of a ball valve 20 opening during the suction stroke and closing during the forcing stroke. In this manner, when the piston $a$ ascends it determines a suction in the gear case 17 by the pipe 19 and when it descends it forces the oil contained in the crank box 18 to pass into the gear case 17, by passing through a channel 21, Fig. 5, provided at the center of the driving shaft $e$.

When the change-speed gearing is at the low speed, as in Figs. 1 and 6, the pinion $g$, Fig. 5, rigidly mounted on the driving shaft $e$ actuates the planet pinion $n$ in gear with the pinion $g$, but the planet pinion $n$ being integral with the pinion $o$, the latter actuates the pinion $l$ which is loose upon the driving shaft; the pinion $l$ then actuates the pinion $m$ as it is integral therewith and this pinion $m$ in its turn actuates the pinion $q$, running in the crown $t$ immobilized by the corresponding brake $y$. It results therefrom that the case in its entirety turns at the low speed and drives the bevel pinion $j$ by its movement.

The motor being in action and the parts at the low speed, if it is desired to pass, for example, to the high speed, the push piece 6 will be brought, by means of the locking device 9, opposite the key $v'$ of the high speed crown; then, by means of the second locking device 13, the lever 10 will be actuated in order to lower the push piece 6, so that it may press upon the key $v'$ corresponding to the high speed. By this operation, the brake $v$ of the high speed will immobilize the corresponding crown $r$, so that the pinion $g$, Figs. 5 and 8 will drive the planet pinion $n$ which will run in the crown $r$ immobilized by the brake $v$, thus driving the case as a whole at the high speed.

For the intermediate speed, the pinion $g$, Figs. 5 and 7, rigidly mounted on the driving shaft $e$ drives the pinion $n$ rigidly mounted on the planet shaft $p$ and as this shaft is integral with the pinion $o$, the latter then turns in the immobilized crown $s$, thus driving the case as a whole at this intermediate speed.

The driving shaft $e$ is provided with a starting device comprising a pinion 22 rigidly mounted on said shaft and a pinion 23 operated by means of a crank.

Claims:

1. In a change speed gearing, a central driving shaft $e$, a pinion $g$ rigidly mounted on said shaft, two pinions $l$ and $m$ integral with one another and loosely mounted on said shaft, a case loose on said shaft, a driving pinion $j$ carried by said case, a planet shaft $p$ loosely mounted within said case, two pinions $n$ and $o$ secured on said shaft $p$, a pinion $q$ loosely mounted on said shaft $p$ three loosely mounted integrally toothed crowns $r$, $s$, and $t$ inclosed within said case, and brakes surrounding said toothed crowns and consisting of double collars $v$, $x$ and $y$.

2. In a change speed gearing, a central driving shaft $e$, a pinion $g$ rigidly mounted on said shaft, two pinions $l$ and $m$ integral with one another and loosely mounted on said shaft, a case loose on said shaft, a driving pinion $j$ carried by said case, a planet shaft $p$ loosely mounted within said case, two pinions $n$ and $o$ secured on said shaft $p$, a pinion $q$ loosely mounted on said shaft $p$ internally toothed crowns $r$, $s$, and $t$ inclosed within said case, and brakes surrounding said toothed crowns and consisting of double collars $v$, $x$ and $y$, a clutching device comprising, in combination with keys $v'$, $x'$ and $y'$ integral with the brakes $v$, $x$ and $y$, a lever 10, a brush device 6, hinged at 7 on said lever 10, a Bowden cable 8, and a locking device 9 for moving the said piece 6 in a lateral direction, a Bowden cable 12 and a locking device 13 for actuating said lever 10 to move said piece 6 in a vertical direction, the rod 14 operatively associated with the lever 10 and the piece 6, a spring 15 operatively associated with the rod 14 and a laterally positioned spring rod 16 operatively associated with the piece 6.

The foregoing specification of my change-speed gear especially applicable to motor vehicles signed by me this thirty-first day of January, 1910.

MARCEL NARCISSE VIRATELLE.

Witnesses:
DEAN B. MASON,
R. EHIRIOT.